Jan. 8, 1957   J. H. ADDICKS   2,776,447
SPRING BALANCE
Filed Nov. 2, 1953

INVENTOR.
Johannes H. Addicks
BY
Attorneys.

United States Patent Office 2,776,447
Patented Jan. 8, 1957

2,776,447
SPRING BALANCE

Johannes Hermanus Addicks, Amsterdam, Netherlands

Application November 2, 1953, Serial No. 389,803

11 Claims. (Cl. 16—197)

The invention relates to a device for balancing a slide window or like construction part with respect of a window casing or like other construction part, consisting of at least one helical spring adapted to be arranged in the sliding direction between the two construction parts and to be fixed at one end to one of the construction parts and which is connected with a nozzle at the other end, which nozzle is coupled in an axially undisplaceable manner by a rotatable tube with one end of the helical spring fixed thereto at the nozzle, and a flat twisted strip passing through the nozzle and adapted to be attached to the other construction part at the end projecting out of the nozzle.

Such a device is known, in which, apart from a spring lying at the outside and loaded by tensile forces, a spring is used which is not loaded by tensile forces and is supported and guided by a tube surrounding it at the outside, which tube is fixedly connected at one end with the spring and with one of the construction parts and carries at the other end a rotatably attached nozzle with a slot for the twisted strip. With this attachment of the nozzle, this latter after mounting lies at an unaccessible place, so that supervision and maintenance of the bearing place of the nozzle is not possible. Further the rotatable attachment of the nozzle to the tube, in which an inturned rim of the tube engages in a circumferential groove of the nozzle, causes difficulties in mass or series manufacture as it is difficult to make such a connection sufficiently accurate, so that if excentric forces act upon it during sliding through of the twisted strip in the nozzle, the rotatable attachment can easily hook and wear takes place.

The invention now aims at meeting the above drawbacks in a simple manner.

According to the invention these drawbacks are overcome by a structure in which the nozzle is fixedly connected with a tube, the other end of which is rotatably connected with a connecting nipple of a spring. In this manner a construction is obtained in which the rotatable connection of the nozzle is removed to the other end of the tube from its location in the known devices whereby the rotatable connection remains easily accessible, as when the window or like sliding construction part is slid down, the upper end of the balancing device always lies above the sliding part when, as usual, the balancing device is arranged in a groove in the side posts of the sliding part. Furthermore the advantage is obtained that a good central thrust bearing can be made, with which hooking is impossible and which when the nozzle is excentrically loaded the frictional resistance in the bearing remains practically unaltered and low. Besides, the construction according to the invention eventually makes it possible, if necessary, to make the total diameter of the whole device still smaller than it is possible with the known constructions.

Advantageously the device can be executed in such a manner that the tube carrying the nozzle, which is fixedly connected to it, passes internally through the helical spring and is connected centrally in a rotatable manner with the connecting nipple of the spring at the other end. In this manner a construction is obtained which is easy to manufacture and in which at the same time the helical spring, which is not loaded by tensile forces, is favourably guided, which is especially of interest when a helical spring is used consisting of thin wire and having a large number of windings.

Appropriately the connection of the tube to the nipple is formed by a filling member, fixedly connected to the tube end and supported in a partly widened central bore of the nipple by a thinner part and a ring arranged on it. In this way a receptacle is formed at the bearing place which can serve for keeping a definite amount of grease or other lubricating substance. Preferably with this construction the ring has an almost half globular shape and is supported in a correspondingly shaped basin in the nipple. In this manner a thrust bearing is obtained with very low friction which, in addition, admits some play in radial direction.

The invention will now be further elucidated with reference to an example of performance shown in the drawing, in which.

Figures 1, 2, 3:
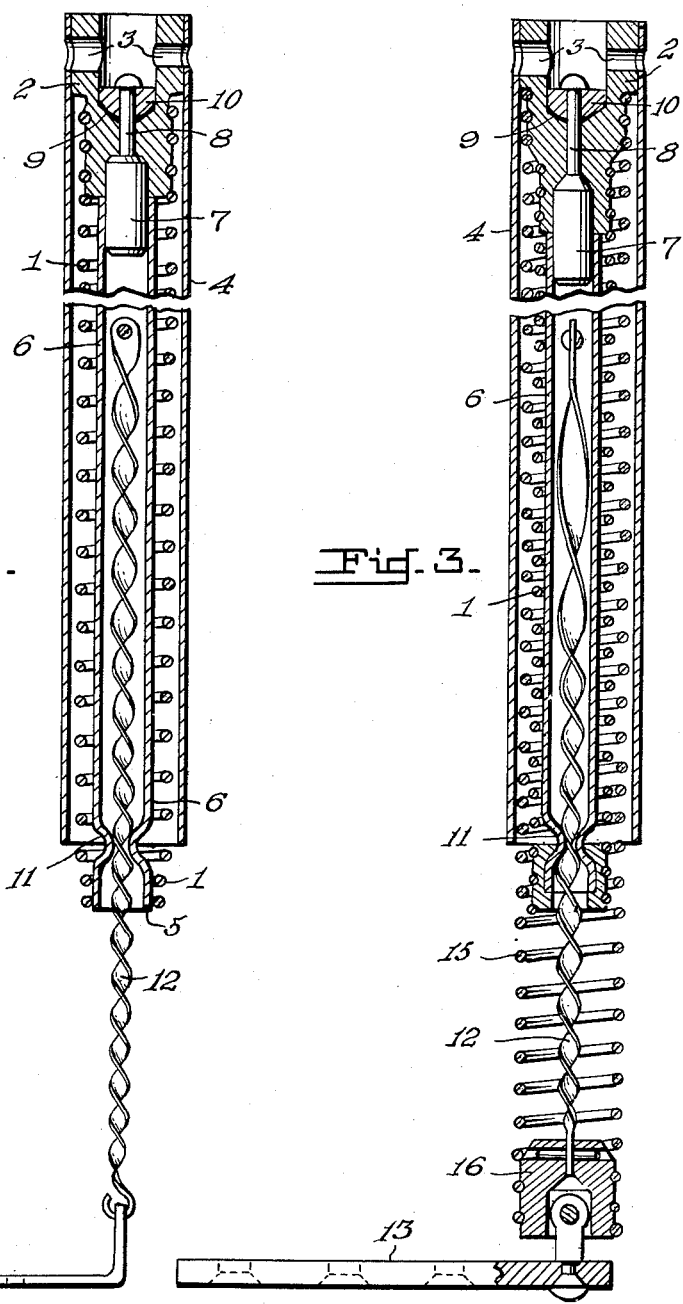
Fig. 1 shows a longitudinal cross-section of a balancing device according to the invention with internally guided spring.
Fig. 2 is a bottom view thereof.
Fig. 3 shows a slightly different balancing device in longitudinal section.

In the drawing 1 indicates the balancing spring which is shown as a helical spring wound of relatively thin wire. At the top end this spring is fixedly connected in usual manner with a connecting nipple 2 with diametrically opposite fixing holes 3, with which the nipple, eventually together with a protecting sleeve 4, can be fixedly connected to a part of the sliding construction, e. g. a window casing post, by means of a screw. At the other end the helical spring is fixedly connected to the exreme end 5 of a tube 6 passing internally through the spring and guiding it, which tube is provided with a filling member 7 which is fixedly connected to it at the top end and of which the thinner part 8 is journaled centrally in a bore debouching in a basin 9 of the connecting nipple 2 and is connected with the nipple by an almost half globular ring 10, therefore with a small contact surface, in an easily rotatable manner. At a small distance above the bottom end of the tube 6 this latter is partly flattened, so that a nozzle with a slot 11 is formed, through which passes a flat twisted strip 12 with relatively flat pitch, the free end of which is nonrotatably connected with a transverse strip 13, having at its extreme end a toothed edge 14 and adapted to be fixed to the bottom side of a window frame or like part with the aid of screws. The transverse strip at the same time serves for giving the necessary prestress to the spring during mounting.

The shown device may also be executed for heavy windows or the like in cooperation with a second spring lying round the first one, as shown in Fig. 3, which second spring 15 is loaded by tensile forces. This second spring is then fixed at one end to a thickened part of the connecting nipple 2 and at the other end to a second nipple 16 which is connected for instance with the transverse strip 13. The device can further also be mounted with the spring 1 at the bottom and the twisted strip 12 at the top, whereby the inner tube 6 at the same time can serve as oil receptable for the lubrication of the strip.

Having now particularly described and ascertained the nature of my said invention and in what manner the same is to be performed I declare that what I claim is:

1. A spring balance for windows of the type having a fixed portion and a movable portion slidably mounted in said fixed portion, said balance comprising a nipple non-rotatably mounted on one of said portions, a helical spring secured to said nipple and extending in the direction of the sliding movement between said portions, a nozzle having a non-circular aperture therethrough secured to the end of said spring remote from said nipple, a tube non-rotatably secured to said nozzle extending from said nozzle to said nipple, thrust bearing means rotatably securing said tube to said nipple, and a twisted strip having a section complementary to the aperture in said nozzle mounted on the other of said portions, extending through said nozzle whereby upon relative sliding motion between said portions said spring is tortionally wound or unwound.

2. Device according to claim 1, characterised in that the tube carrying the nozzle, which is fixedly connected to it, passes internally through the helical spring and is connected centrally in a rotatable manner with the connecting nipple of the spring at the other end.

3. Device according to claim 2, characterised in that the connection of the tube with the nipple is formed by a filling member which is fixedly connected to the end of the tube and is supported in a partly widened central bore of the nipple with the aid of a thinner part and a ring mounted on it.

4. Device according to claim 3, characterised in that the ring has an almost half globular shape and is supported in a correspondingly shaped basin in the nipple.

5. A sash balance for a window of the type including a window frame and a sash movable therein, said balance comprising a spiral member having one end attached to the sash at the bottom thereof and the other end extending along the direction of relative movement, a coil spring secured to a nipple fixed to the window frame and into which the spiral member is adapted to penetrate, a tubular support within said coil spring, said tubular element being rotatably secured to said nipple at one end and nonrotatably fixed to the coil spring at the other end, and a nozzle element mounted within the tubular support at the end where it is nonrotatably secured to the spring, whereby relative movement between the window frame and sash winds or unwinds the said coil spring.

6. In a device of the class described, an elongated spiral member having a convoluted spiral groove formed in the periphery thereof, an elongated coil spring member adapted to have one end non-rotatably attached to a nipple and having a free end rotatable on said spiral member, means at the free end of said spring member providing a nozzle member, means providing a non-rotatable connection between said nozzle member and said spring member whereby when said spiral member is introduced into said nozzle member and said spiral member is moved longitudinally in one direction the free end of said spring member will rotate around over said spiral member whereby said spiral member will be drawn into said spring member and whereby when said spiral member is moved longitudinally in an opposite direction the free end of said spring member will rotate in an opposite direction around said spiral member and said spiral member will be retracted out of said spring member, and a tubular support secured to said nozzle and rotatably mounted on said nipple.

7. The device of claim 5 in which the coil spring is prestressed by twisting to bias the spiral member to be drawn into said spring member.

8. A spring balance for balancing the sliding part of a sliding construction, such as the sash of a double hung window, consisting in combination of at least one helical spring adapted to be arranged in the direction of sliding between the sliding construction part and the frame, a nipple to which one end of the spring is secured and which is adapted to be fixed to one of the parts of the sliding construction, a slotted nozzle for engagement with a twisted strip passing through it and connected to the other construction part, said nozzle being secured at the end of said spring remote from said nipple, a tube lying inside said spring and carrying said nozzle at one end in a non-rotatable manner, said tube being rotatably connected to said stationary nipple at the other end with a thrust bearing.

9. A spring balance according to claim 8, in which said spring consists of a helical spring with a large number of turns of relatively thin wire which is too weak for carrying the weight of the slidable construction part and in which the twisted strip is twisted to a relatively flat pitch such that it develops an effective pulling reaction by the torsional reaction of said spring.

10. A spring balance according to claim 8, in which the tube is provided at its upper end with a thinner elongation passing amply through a boring in the stationary spring securing nipple which merges in a wider boring part with a conical bottom on which rests a ball-shaped ring secured to the end of said thinner elongation.

11. The device of claim 1 including a tension spring secured to said nipple and including a second nipple mounted on the other of said portions, said tension spring enveloping said helical spring and said twisted strip and secured to said second nipple.

References Cited in the file of this patent

UNITED STATES PATENTS

| | | |
|---|---|---|
| 1,864,745 | Larson | June 28, 1932 |
| 1,910,112 | Larson | May 23, 1933 |
| 2,477,069 | Larson | July 26, 1949 |
| 2,565,804 | De Vries et al. | Aug. 28, 1951 |
| 2,604,655 | Peremi | July 26, 1952 |
| 2,622,267 | Peremi | Dec. 23, 1952 |
| 2,659,929 | Hess | Nov. 24, 1953 |

FOREIGN PATENTS

| | | |
|---|---|---|
| 467,615 | Great Britain | June 21, 1937 |